(12) United States Patent
Kampmann et al.

(10) Patent No.: US 11,347,569 B2
(45) Date of Patent: May 31, 2022

(54) EVENT-BASED FRAMEWORK FOR DISTRIBUTED APPLICATIONS

(71) Applicant: Microsoft Technology Licensing, LLC, Redmond, WA (US)

(72) Inventors: Bo Kampmann, Kongens Lyngby (DK); Abhishek Ghosh, Copenhagen (DK); Gaurav Roy, Copenhagen (DK); Lennart Conrad, Skovlunde (DK); Andrew James Stach, Fargo, ND (US); Alexandros Kalomoiros, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/141,965

(22) Filed: Jan. 5, 2021

(65) Prior Publication Data
US 2022/0107853 A1 Apr. 7, 2022

Related U.S. Application Data

(60) Provisional application No. 63/088,951, filed on Oct. 7, 2020.

(51) Int. Cl.
*G06F 9/54* (2006.01)
(52) U.S. Cl.
CPC .............. *G06F 9/542* (2013.01); *G06F 9/546* (2013.01)
(58) Field of Classification Search
CPC .......... G06F 9/4812; G06F 9/54; G06F 9/542; G06F 9/546

(Continued)

(56) References Cited

U.S. PATENT DOCUMENTS

| 4,665,520 A | 5/1987 | Strom et al. |
| 8,327,377 B2 | 12/2012 | Krishnamurthy et al. |

(Continued)

FOREIGN PATENT DOCUMENTS

EP 3690649 A1 8/2020

OTHER PUBLICATIONS

"WFP User Guide—2. Dashboards", Retrieved from: https://docs.oracle.com/cd/E89525_01/html/WFP_User_Guide/Dashboard.htm, Retrieved Date: Sep. 28, 2020, 21 Pages.

(Continued)

*Primary Examiner* — Andy Ho
(74) *Attorney, Agent, or Firm* — Chin IP, PLLC

(57) ABSTRACT

The disclosed technology is generally directed to a Resource Planning system. In one example of the technology, at a first site, a plurality of messages is received from a second site. The messages of the plurality of messages are associated with events. The events include dependencies that are associated with the events. The first site is not the second site. The events are associated with at least one of updating data or updating perpetual cost calculations. Messages of the plurality of messages having a first dependency level are determined based on the dependencies. The messages determined to have the first dependency level are processed. Messages of the plurality of messages having a second dependency level based on the dependencies are determined. The messages determined to have the second dependency level are processed after processing the messages determined to have the first dependency level.

20 Claims, 7 Drawing Sheets

(58) Field of Classification Search
USPC .......................................... 719/313, 314, 318
See application file for complete search history.

(56) References Cited

U.S. PATENT DOCUMENTS

| | | |
|---|---|---|
| 8,490,055 B2 | 7/2013 | Basak et al. |
| 8,539,492 B1 | 9/2013 | Beckford et al. |
| 8,838,534 B2 | 9/2014 | Fowler |
| 10,255,049 B2 | 4/2019 | Klemenz et al. |
| 10,284,515 B2* | 5/2019 | Zhang .................... H04L 51/36 |
| 2014/0258226 A1 | 9/2014 | Noteboom |
| 2015/0172412 A1* | 6/2015 | Escriva ................. G06F 16/182 |
| | | 709/202 |
| 2018/0276040 A1 | 9/2018 | Hosmani et al. |
| 2019/0141006 A1 | 5/2019 | Schnitt |
| 2019/0392061 A1 | 12/2019 | Terry et al. |
| 2020/0125656 A1 | 4/2020 | Li |
| 2020/0162352 A1* | 5/2020 | Jorgenson ............. G06F 11/302 |
| 2020/0242616 A1 | 7/2020 | Waughtal |

OTHER PUBLICATIONS

Saad, et al., "Processing Transactions in a Predefined Order", In Proceedings of 24th Symposium on Principles and Practice of Parallel Programming, Feb. 16, 2019, 15 Pages.

Habas, Cathy, "Hub & Spoke Model: Definition, Benefits & Examples", Retrieved from: https://bizfluent.com/13721308/hub-spoke-model-definition-benefits-examples, Sep. 9, 2019, 4 Pages.

"International Search Report and Written Opinion Issued in PCT Application No. PCT/US2021/042130", dated Nov. 12, 2021, 12 Pages.

* cited by examiner

EVENT-BASED FRAMEWORK FOR DISTRIBUTED APPLICATIONS

CROSS-REFERENCE TO RELATED APPLICATION(S)

This application claims priority to U.S. Provisional Pat. App. No. 63/088,951, filed Oct. 7, 2020, entitled "EVENT-BASED FRAMEWORK FOR DISTRIBUTED APPLICATIONS". The entirety of this aforementioned application is incorporated herein by reference.

BACKGROUND

A Resource Planning (RP) system typically includes resource management software that can be used to enable an organization to manage and automate organizational processes, and to manage data associated with the organization. This data may include resources such as cash, inventory, raw materials, and/or the like, as well as information such as the statuses of orders and/or the like. Many RP systems implement perpetual cost calculations.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to a Resource Planning system. In one example of the technology, at a first site, a plurality of messages is received from a second site. In some examples, the messages of the plurality of messages are associated with events. In some examples, the events include dependencies that are associated with the events. The first site is not the second site. In some examples, the events are associated with at least one of updating data or updating perpetual cost calculations. In some examples, messages of the plurality of messages having a first dependency level are determined based on the dependencies. In some examples, the messages determined to have the first dependency level are processed. In some examples, messages of the plurality of messages having a second dependency level based on the dependencies are determined. In some examples, the messages determined to have the second dependency level are processed after processing the messages determined to have the first dependency level.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
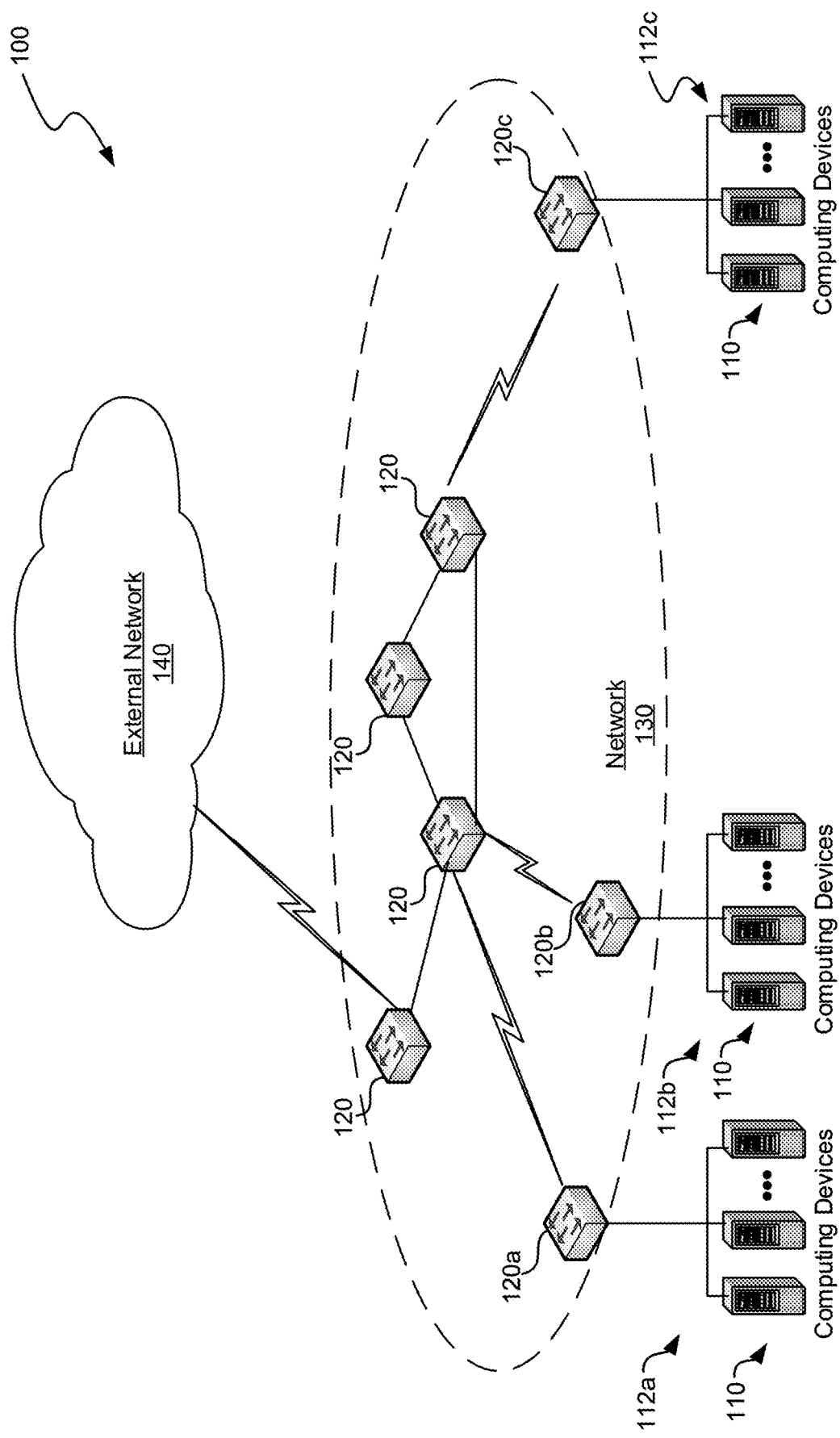
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing"

refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to a Resource Planning system. In one example of the technology, at a first site, a plurality of messages is received from a second site. In some examples, the messages of the plurality of messages are associated with events. In some examples, the events include dependencies that are associated with the events. The first site is not the second site. In some examples, the events are associated with at least one of updating data or updating perpetual cost calculations. In some examples, messages of the plurality of messages having a first dependency level are determined based on the dependencies. In some examples, the messages determined to have the first dependency level are processed. In some examples, messages of the plurality of messages having a second dependency level based on the dependencies are determined. In some examples, the messages determined to have the second dependency level are processed after processing the messages determined to have the first dependency level.

In some examples, an event-based framework is used to enable RP applications to be used as distributed applications. In some examples, whenever events are communicated via messages, from one instance of the distributed application to another, the events include dependencies that define the order in which the messages are to be processed by the receiving instance. In some examples, the dependency levels are grouped into multiple levels of a hierarchy. For instance, in one example, the dependencies may define that all messages associated with a particular job should be processed before all messages associated with another job, but for each particular job, messages should be processed chronologically based on time.

Network outages and other issues may cause events to be communicated in a burst when the messages are finally sent. The dependencies may be used to ensure that messages are processed in the correct order in spite of a network outage or other issues. In some examples, the event-based framework enables the ability to scale out to multiple threads, while at the same time ensuring that messages are always processed in the right order (based on the dependencies), maintaining consistency of critical data.

In some examples, users are able to interact with the distributed application via a role-based user interface. The role-based user interface may be a user-friendly user interface for non-technical users to perform functions and view statuses associated with messages.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to execute an instance of a distributed application in which a framework is used to provide and enforce dependencies for messages sent between instances of the distributed application.

Illustrative Computing Device

Figure 2:
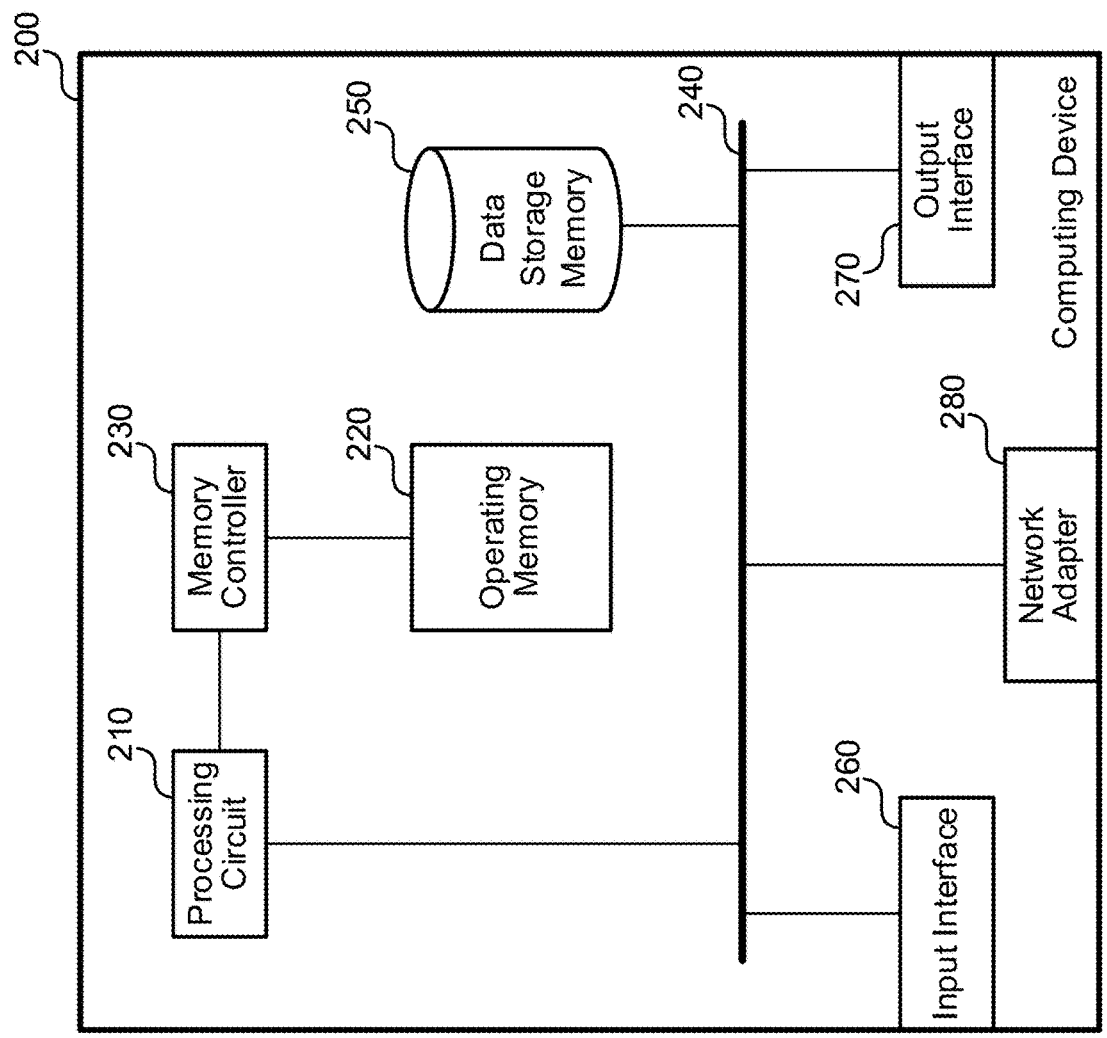
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices illustrated in or referred to in FIG. 3, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, where the actions may include, in some examples, executing an instance of a distributed application in which a framework is used to provide and enforce dependencies for messages sent between instances of the distributed application.

Illustrative System

Figure 3:
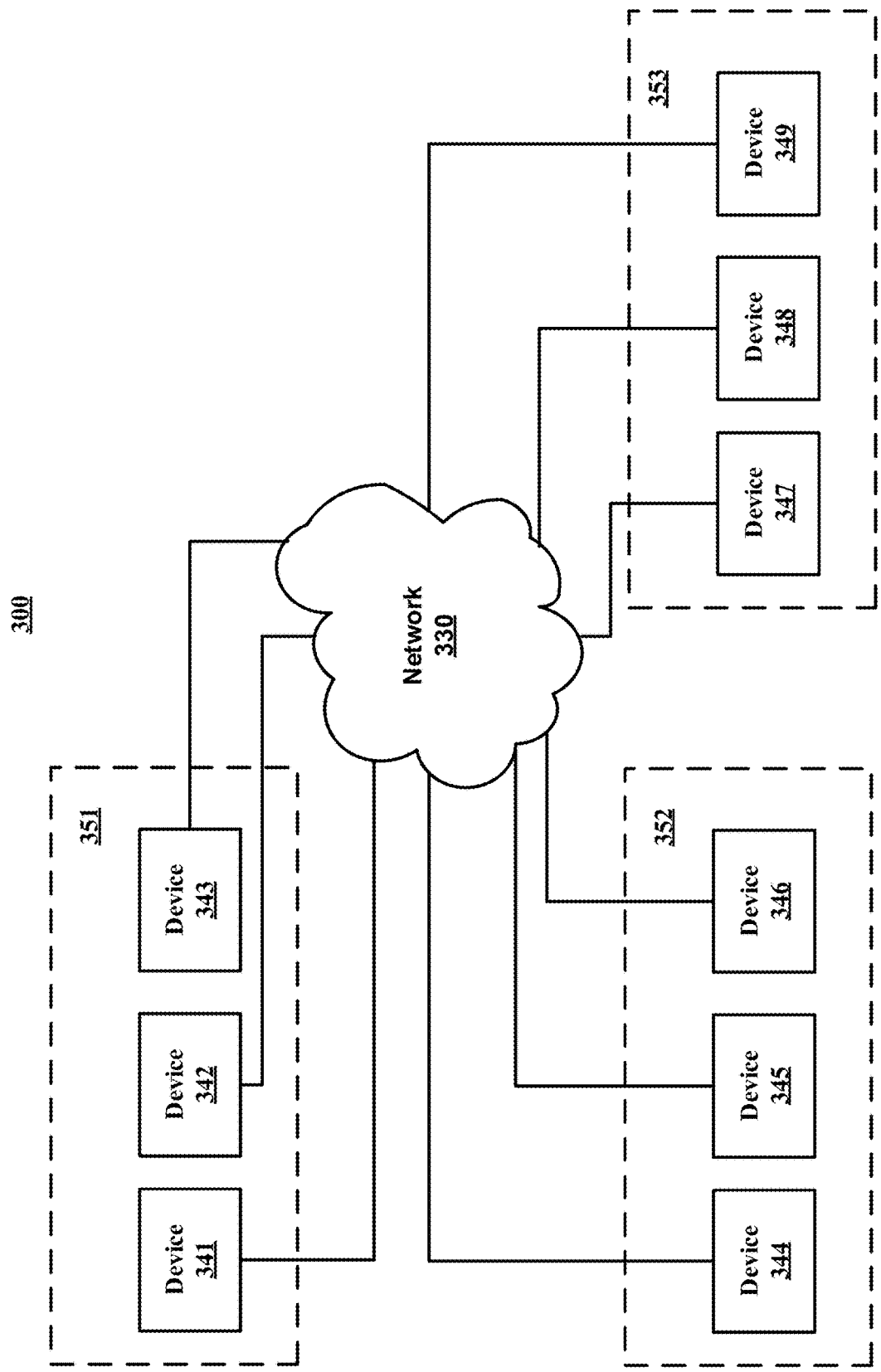
FIG. 3 is a block diagram illustrating an example of a system.

FIG. 3 is a block diagram illustrating an example of a system (300). System 300 may include network 330, as well as sites 351, 352, and 353. Each site may include one or more devices. For instance, in some examples, site 351 includes device 341, device 342, and device 343; site 352 includes device 344, device 345, and device 346; and site 353 includes device 347, device 348, and device 349.

Each of the devices 341-349 may include examples of computing device 200 of FIG. 2.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSIs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel between tenant devices 341-349. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

System 300 may include more or less devices than illustrated in FIG. 3, which is shown by way of example only. For instance, in various examples, there may be less devices or more devices or many more devices than three devices per site, and less than three sites or more than three sites or many more than three sites, as literally illustrated in FIG. 3, which is shown byway of example and simplified illustration only.

In some examples, an event-based framework is used enable RP applications to be used as distributed applications, where, for example, one instance of a distributed application is executed at one or more devices of site 351, another instance of the distributed application is executed at one or more devices of site 352, and yet another instance of the distributed application is executed at one or more devices of site 353. In some examples, whenever events are communicated via messages, from one instance of the distributed application to another, the events include dependencies that define the order in which the messages are to be processed by the receiving instance. In some examples, the dependency levels are grouped into multiple levels of a hierarchy. For example, the dependencies may define that all messages associated with a particular job should be processed before all messages associated with another job, but for each particular job, the messages should be processed chronologically based on time.

The distributed application may make use of various topologies in various examples. For instance, in some examples, a hub-and-spoke topology may be used. For instance, in some examples, site 351 is a hub site, and each other site, including, for example, site 352 and site 353, is a spoke site.

In other examples, distributed application topologies other than a hub-and-spoke topology may be used. In various examples, any suitable topology may be used. Among other things, in some examples, the distributed application runs across the cloud and on the edge, or across multiple cloud instances.

Figure 4:
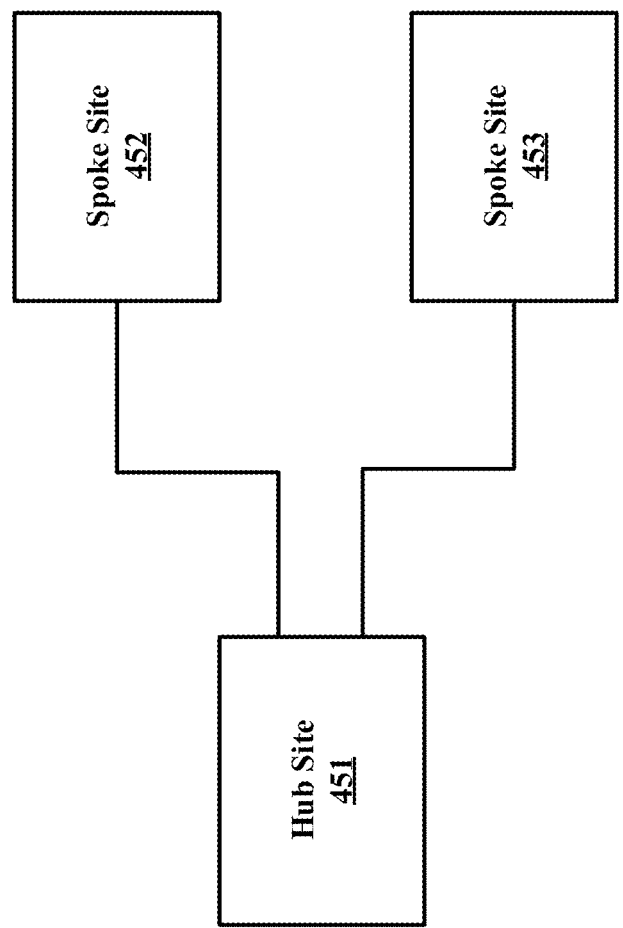
FIG. 4 is a block diagram illustrating an example of the system of FIG. 3.

One example of a hub-and-spoke topology is illustrated in FIG. 4.

FIG. 4 is a block diagram illustrating an example of a system (400). System 400 may be an example of system 300 of FIG. 3. System 400 may include hub site 451, spoke site 452, and spoke site 453.

In some examples, hub site 451 is a manufacturing and warehousing back office that runs a primary/master instance of a distributed application. In some examples, each spoke site (e.g., spoke site 452 and spoke site 453) is a regional client facility such as a factory, warehouse, production center, or the like, with an instance of the distributed application installed locally as a separate deployment. In some examples, the distributed application may be used to provide synchronization, such as synchronization of data, synchronization of sales operations, synchronization of procurement operations, and/or the like. In some examples, hub site 451 is on the cloud and the spoke sites are on the edge.

In some examples, system 400 may make use of an RP application that operates as a distributed application with an instance running in the cloud at hub site 451 and an instance running in each spoke site. In some examples, the distributed RP application implements perpetual cost calculations. In some examples, the perpetual cost calculations are made by a perpetual cost system in which events are processed in order to perform the perpetual cost system, and to synchronize data among the instances of the distributed RP application. In some examples, accuracy of the perpetual cost systems relies on events being processed in the correct order. In some examples, data consistency for the RP application is paramount, because incorrect data in the account books or incorrect inventory being reported could have negative financial and/or legal implications.

System 400 may be used to register events on a system on the edge, for example on one of the spoke sites, and send these events for processing in the cloud, for example at hub site 451. In some examples, system 400 may enable an organization to be able to continue critical operations if the connection to the cloud is down.

In some examples, events are communicated from one site to another via messages. In some examples, the messages do not contain the data itself, but instead contains references to data. In some examples, reference data is sent first, and then messages with references to the reference data are sent. In some examples, the messages and the reference data are sent using different data transfer mechanisms and are sent independently of each other. In some examples, the receiving instance acts on the messages only after the messages and the reference data have been received. In other examples, the messages may instead include the reference data.

In some examples, an event-based framework is used to ensure that the messages are processed in the right order. Before messages are sent from one site to another, the event-based framework may be used to provide a dependency for each message, where the message dependencies are used to determine the order in which the messages are processed at the receiving site. In some examples, the framework uses a message processor at each instance to send a message, where a user may communicate with the message processor via an application program interface (API) in some examples. A particular example of a process for sending a message is illustrated in FIG. 5.

Figure 5:
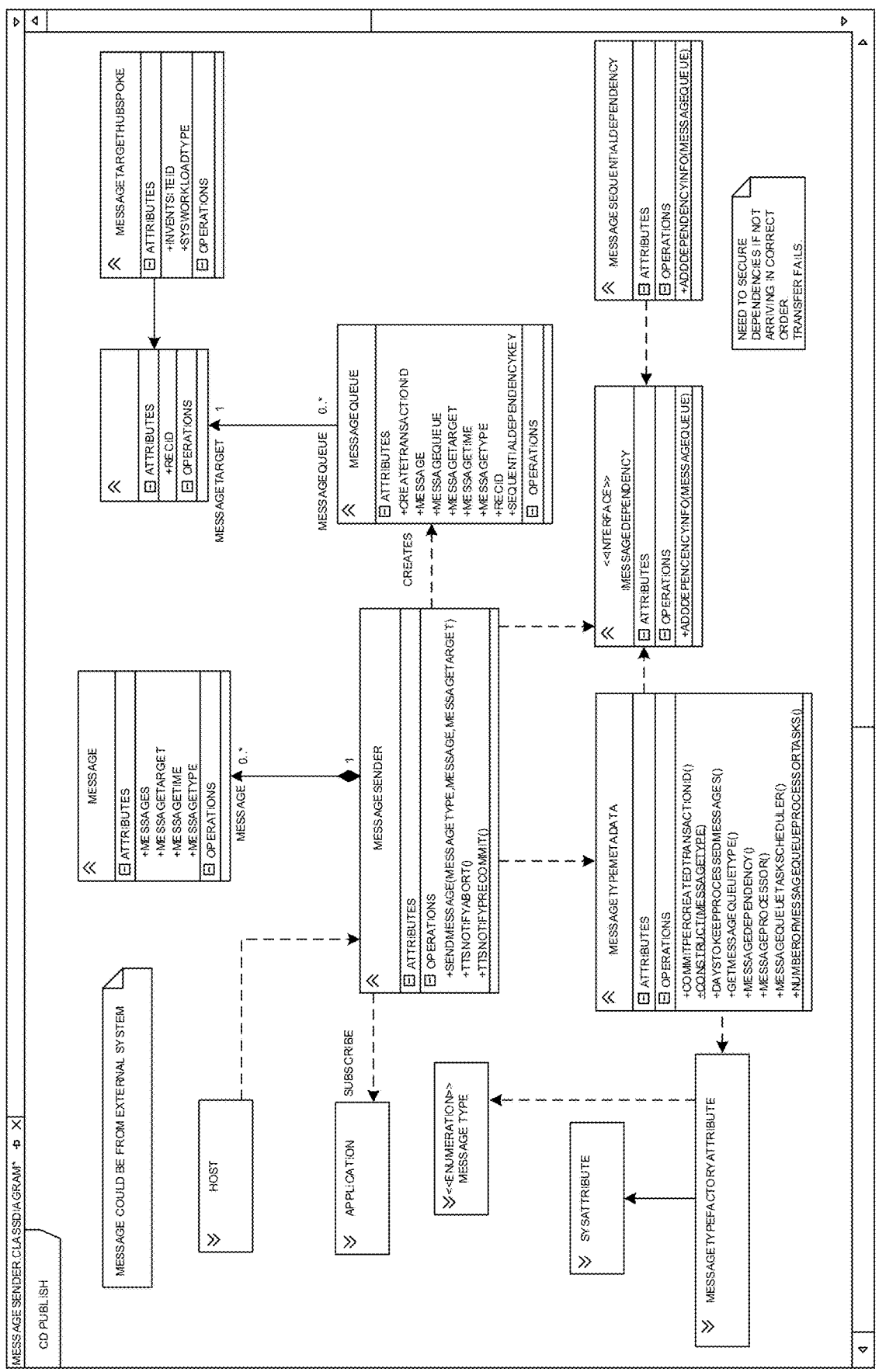
FIG. 5 is a class diagram of illustrating an example process for sending a message.

FIG. 5 is a class diagram of illustrating an example process for sending a message. In the example illustrated in FIG. 5, the API "MessageSender.sendMessage" is called to send a message. In the specific example of an API illustrated in FIG. 5, the API requires a message type, a message target defining the destination for the message, and optionally a source message target defining the source of the message. In some examples, the message type indicates what type of message the message is so that the target system can properly process the message.

In the particular example illustrated in FIG. 5, a message is sent using the illustrated API as follows. When MessageSender.sendMessage is called to send a message, the message is temporarily stored in a collection in memory. When a commit is performed, a message type assigned to the message is used to lookup metadata for the message type. A message queue is assigned to the message together with dependencies. The system can be extended to handle different types of dependencies. The message and dependencies are persisted in the database. An existing transport mechanism is then used to deliver the messages to the message target destination via a transport mechanism that delivers messages reliably.

In some examples, messages can be received by the receiving site by both push and pull mechanisms. In some examples, the messages are persisted in a database and processed at a given interval.

Figure 6:
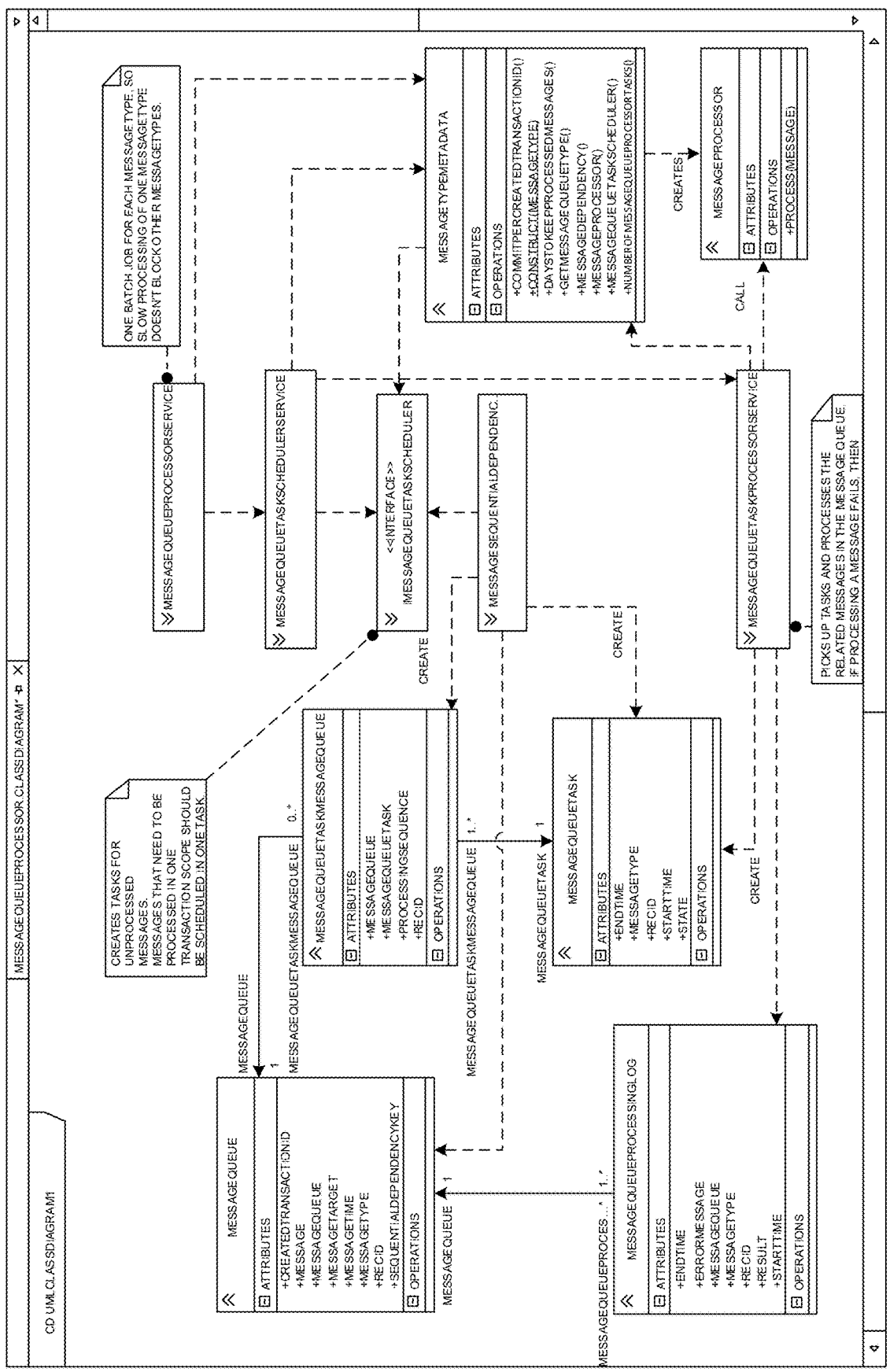
FIG. 6 is a class diagram of illustrating an example process for sending and receiving a message.

FIG. 6 is a class diagram of illustrating an example process for sending and receiving a message. In some examples, after a message is received by the receiving site, the message is stored and combined with business data. Next, in some examples, the framework causes the messages to be sorted and scheduled based on dependencies by a message queue scheduler running on an instance of the distributed application at the receiving site. In some examples, the messages are then processed based on the scheduling. In some examples, dependent messages are assigned to bundles/sets of messages that are to be processed in the scheduled order.

In some examples, multiples types of dependencies may be used by the framework, including sorting based on a key and time, a topological sort of dependencies, other suitable types of dependencies, and a combination or one or more of the above. In some examples, the dependency levels are grouped into multiple levels of a hierarchy. In some examples, the framework allows the defining of complex dependencies between messages. In some examples, the framework enables the customers to define and add additional types of dependencies.

In some examples, a key is an abstract identifier that identifies how messages are grouped or sorted. As an example of sorting based on a key and time, jobs may be identified with a job identification (ID) that acts as a key, where each job may include multiple events that are time stamped. Dependencies may exist between the keys. For example, all of the events for one particular job, as identified by the job ID of the jobs, may need to be processed before any of the events for another particular job. However, it may also be that, for example, for each job, the messages should be processed in time order relative to the other messages in the job based on the time stamps on the messages.

One example of a simple dependency is that a product needs to be received before it is shipped. With manufacturing dependencies things may be more complex in some examples. For instance, in some examples, dependencies may be employed based on the fact that a product needs to be received before it is consumed in a production. In some examples, a dependency may be based on the fact that the produced product needs to be produced before it is consumed in another production or shipped to a customer or another site.

In some examples, for a topological sort, bundles are assigned a dependency level, so that messages with the same dependency level can be processed in parallel for scalability. In some examples, when the messages have been scheduled, a number of processing tasks/threads are started in order to process the messages for the first dependency level. In some examples, when all of the processing for the dependency level is completed, a number of next tasks/threads is started in order to process the next dependency level. In some examples, this continues until all dependency levels has been processed. One example of the processing is illustrated in FIG. 5.

Figure 7:
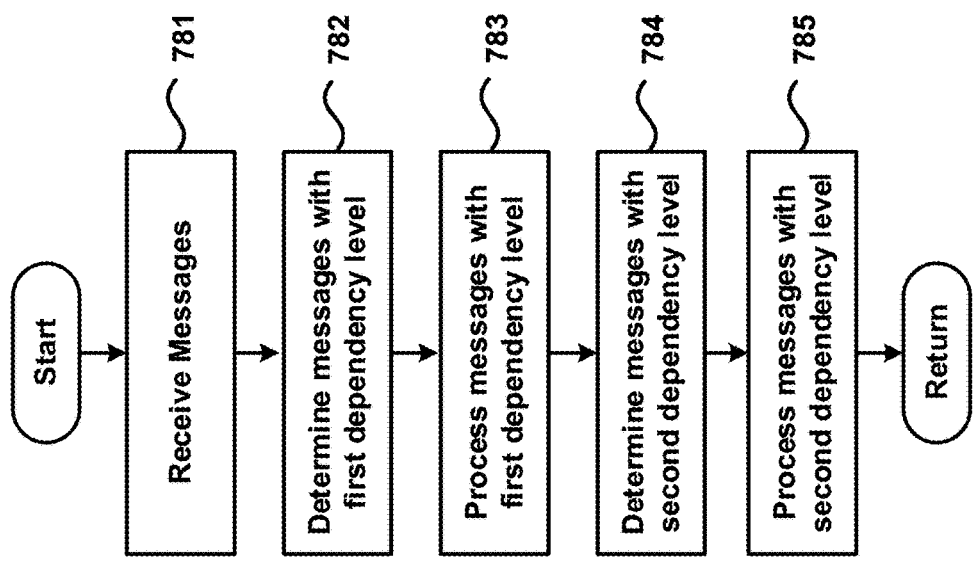
FIG. 7 is a flow diagram illustrating an example process for processing messages, in accordance with aspects of the present disclosure.

FIG. 7 is a flow diagram illustrating an example process (780) for an RP system.

In the illustrated example, step 781 occurs first. At step 781, in some examples, at a first site, a plurality of messages is received from a second site. In some examples, the messages of the plurality of messages are associated with events. In some examples, the events include dependencies that are associated with the events. The first site is not the second site. In some examples, the events are associated with updating data and/or updating perpetual cost calculations.

As shown, step 782 occurs next in some examples. At step 782, some examples, messages of the plurality of messages having a first dependency level are determined based on the dependencies. As shown, step 783 occurs next in some examples. At step 783, in some examples, the messages determined to have the first dependency level are processed.

As shown, step 784 occurs next in some examples. At step 784, in some examples, messages of the plurality of messages having a second dependency level based on the dependencies are determined. As shown, step 785 occurs next in some examples. At step 785, in some examples, the messages determined to have the second dependency level are processed after processing the messages determined to have the first dependency level. The process may then proceed to the return block, where other processing is resumed.

In some examples, the result of the processing is stored in a log. In some examples, the log includes the error and the result of the processing. In some examples, the message includes an indication of what should be done if the processing of the message failed, such as an indication that the message should be skipped if a dependent message failed, an indication that the processing should be rolled back if a dependent message failed, or the like. The message may also include an indication as to whether the message should be retried, and if so when the message should be retried and how many times the message should be retried. In some examples, the result of the processing of a message may be: failed, skipped, rolled back, or processed. In some examples, the result of the processing of the message is stored and persisted so that the same message cannot be successfully processed twice.

In some examples, when a connection between the edge and cloud has been down, both the cloud and edge may receive a burst of messages. In some examples, dependencies are used so that messages are processed in parallel in the correct order in spite of the fact that the connection between the edge and the cloud was down.

In some examples, every event received is persisted, and if the processing of the event fails in the target, the framework causes a relevant user is notified. In some examples, the user can then take corrective measures and cause the event to be reprocessed.

There is existing RP software which is not designed for distributed processing. Typical event-processing frameworks perform event processing in a fire-and-forget fashion. However, typically, with distributed systems, there is no guarantee that the messages will be delivered in order. Some examples of the framework discussed herein enable such existing RP software and databases to be used without altering the code, by defining a framework which defines dependencies between the different messages, communicating the messages with dependencies, and processing the messages based on the dependencies as discussed herein. In this way, in some examples, the framework can be used to add a layer to an existing RP system that augments the existing RP system to preserve the consistency of dependency while still communicating the data in the same schema of the existing RP system. Some examples are used with such an existing RP system, and some examples are used with software that is designed for distributed processing also.

In some examples, the framework provides a role-based user interface (UI) to end users. In some examples, the UI displays important information from the messages to the end user. In some examples, the role-based UI acts as an understandable cockpit for a user to monitor and review statuses of events, and includes rules to notify relevant persons. In some examples, the UI provides non-technical-user-friendly, role-based notification rules. The UI may enable users to store, troubleshoot, and replay events, even after the events are processed. The UI may provide a log to enable the user to see how the processing of messages was scheduled. In some examples, the role-based UI enables the user to: process or cancel a message, see the current state of a message, and/or see when a message was processed and the result of the processing of the message. The UI may provide traceability and debuggability to the user.

In some examples, messages may be sent from the hub site 451 to spoke sites, as well as from spoke sites to hub site 451. For instance, in some examples, a production supervisor or production planner may deem that the requirements for a production order are met. For example, the production planner may determine that the requirement for the production order are met based on all of the raw materials being in place, the machine capacity being available, and the like.

When the production planner determines that the requirements for the production order are met, the production planner may release a production order. The production order may be a message sent from the hub site 541 to the spoke site at which work for the production order is to be performed.

When the production order is received by the spoke site, the production order may act as a signal to workers at the spoke site that the order is now ready to be picked up. The production order may be broken down into several jobs. As each job is done, the worker may indicate through a device at the spoke site that the job is done, which may result in a message being generated that is added to the message queue of messages be sent from the spoke site to hub site 451. Other information related to the job may also be added as messages to the message queue in various examples.

In some examples, hub site 451 acts as a master, and only hub site 451 may update the data such as inventory, so that the data is read-only at the spoke sites. In these examples, the spoke sites cannot alter the data directly. The spoke sites can cause the data to be altered by communicating messages to hub site 451, so that the master, hub site 451, can alter the data.

In some examples, when messages are received, the received messages are sorted and scheduled based on the dependencies. In some examples, dependent messages are picked up by the number of threads. In some examples, the number of threads is determined by a service level agreement (SLA) that indicates that messages are expected to be processed within a certain time. In some examples, in order to avoid exhaustion of other system resources when recovering from a connection that has been down, there is a configurable maximum number of threads. In some examples, transaction scope is used as a special dependency indicating that multiple messages are to be processed as an atomic unit.

Accordingly, in some examples, the messages are processed with resources needed to fulfill the SLA or the available resources in case the connection between the edge and the cloud has been down. In this way, in these examples, the messages are processed with resources needed to fulfill the SLA. Also, in these examples, the processing of messages does not exhaust system resources to fulfill the SLA when recovering from a connection that has been down. In some examples, accordingly, system 400 enables the ability to scale out to multiple threads as required, while at the same time ensuring that messages are always processed in the right order, maintaining consistency of critical data.

Various examples described above involve one application running on various nodes, with difference instances of the same application operating on the various nodes. However, in other examples, rather than the same application running on the various nodes, separate services run on the various nodes, with one application running on one node signaling another application on another node using the message framework, rather than one instance of the same application signaling another instance of the same application. These examples and others are within the scope of the disclosure.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
receiving, at a first site, a plurality of messages from a second site, wherein the messages of the plurality of messages are associated with events;
receiving, at the first site, dependencies that are associated with the events, wherein the first site is not the second site, and wherein the events are associated with at least one of updating data or updating perpetual cost calculations;
determining messages of the plurality of messages having a first dependency level based on the dependencies;
processing the messages determined to have the first dependency level;
determining messages of the plurality of messages having a second dependency level based on the dependencies; and
processing the messages determined to have the second dependency level after processing the messages determined to have the first dependency level.

2. The apparatus of claim 1, wherein at least one of the dependencies is based at least in part on a key and time.

3. The apparatus of claim 1, wherein the dependency levels are based at least in part on a topologic sort of the dependencies.

4. The apparatus of claim 1, the actions further including enabling another type of dependency to be added.

5. The apparatus of claim 1, wherein the plurality of messages is received over a network by a first instance of a distributed application at the first site from a second instance of the distributed application at the second site.

6. The apparatus of claim 1, the actions further including providing a role-based user interface that displays information about the processing of the messages.

7. The apparatus of claim 1, wherein at least one of the dependencies is a multi-hierarchical-level hierarchical dependency.

8. The apparatus of claim 7, wherein the dependency levels are based at least in part on: keys, time, and the hierarchical dependency.

9. A method, comprising:
storing, at a first site, a plurality of messages, wherein the messages of the plurality of messages are associated with events, and wherein the events are associated with at least one of updating data or updating perpetual cost calculations;
employing a processor to assign dependencies to each message of the plurality of messages, such that the assigned dependencies define an order by which the messages of the plurality of messages are to be processed by a second site; and
causing the plurality of messages and the assigned dependencies to be communicated from the first site to the second site, wherein the first site is not the second site.

10. The method of claim 9, wherein assigning the dependencies is accomplished such that at least one of the dependencies is assigned based at least in part on a key and time.

11. The method of claim 9, wherein assigning the dependencies is accomplished such the defined order is based, at least in part, on a topologic sort of the dependencies.

12. The method of claim 9, further comprising enabling another type of dependency to be added.

13. The method of claim 9, wherein causing the plurality of messages and the assigned dependencies to be communicated is accomplished such that the plurality of messages is communicated over a network by a first instance of a distributed application at the first site to a second instance of the distributed application at the second site.

14. The method of claim 9, further comprising providing a role-based user interface that displays information about the processing of the messages.

15. The method of claim 9, wherein assigning the dependencies is accomplished such that at least one of the dependencies is a multi-hierarchical-level hierarchical dependency.

16. The apparatus of claim 15, wherein the defined order is based at least in part on: keys, time, and the hierarchical dependency.

17. A processor-readable storage medium, having stored thereon processor-executable code that, upon execution by at least one processor, enables actions, comprising:
receiving, at a first instance of a distributed application at a first site, a plurality of messages from a second instance of the distributed application at a second site, wherein the messages of the plurality of messages are associated with events;
receiving, at the first instance of the distributed application at the first site, dependencies that are associated with the events, wherein the first site is not the second site;
processing, among the plurality of messages, messages having a first dependency level; and
processing, among the plurality of messages, messages having a second dependency level after processing the messages having the first dependency level, wherein the first dependency level and the second dependency level are based on the received dependencies.

18. The processor-readable storage medium of claim 17, wherein at least one of the dependencies is based at least in part on a key and time.

19. The processor-readable storage medium of claim 17, wherein the dependency levels are based at least in part on a topologic sort of the dependencies.

20. The processor-readable storage medium of claim 17, the actions further including enabling another type of dependency to be added.

* * * * *